Nov. 3, 1931.         W. G. JOHNSON         1,829,862
CASTER
Original Filed June 11, 1926

Inventor
Wilfred G. Johnson
By Slough and Caufield
Attorneys

Patented Nov. 3, 1931

1,829,862

UNITED STATES PATENT OFFICE

WILFRED G. JOHNSON, OF ELYRIA, OHIO, ASSIGNOR TO THE COLSON COMPANY, OF ELYRIA, OHIO, A CORPORATION OF OHIO

CASTER

Original application filed June 11, 1926, Serial No. 115,279. Divided and this application filed June 25, 1929. Serial No. 373,510.

This invention relates to casters and more particularly to improvements in ball bearing swiveling casters.

One of the objects of my invention is to provide a swiveling caster in which friction of the relatively movable swiveling parts is reduced to a minimum.

Another object of my invention is to provide an improved swiveling caster in which the swiveling is accomplished without rotating or otherwise moving the portion by which the caster is secured to the article to be supported.

Another object is to provide a swiveling caster of the ball bearing type in which the ball bearings are shielded from the collection of dust in an improved manner.

Another object is to provide a swiveling caster of the ball bearing type constructed in a manner to permit its quick and easy assembling, whereby defective or worn parts in manufacture or use, respectively, may be easily and inexpensively removed and replaced.

Another object is to provide an improved caster of the ball bearing swiveling type of improved and simplified construction, whereby, by the removal of a single screw threaded part, the entire ball bearing, including the races and balls, may be detached from the caster and taken apart to inspect or repair it, and whereby conversely the original assembling of the caster is rendered quick and cheap.

Another object is to provide an improved swiveling caster of durable construction and which will be inexpensive to manufacture and easily and quickly assembled from a minimum number of parts.

Another object is to provide an improved swiveling caster which may be made from stampings and screw machine made parts, and thereby made cheap to produce.

Other objects of my invention and the invention itself will be apparent upon reference to the accompanying description of an embodiment thereof and which embodiment is illustrated in the accompanying drawings, in which:—

Figure 2:
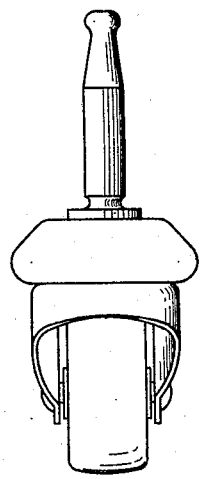
Fig. 2 is a rear elevational view of the caster of Fig. 1.
Figure 1:
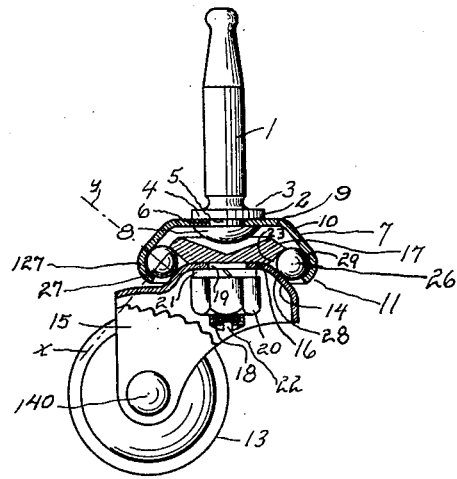
Fig. 1 is a side elevational view of a caster embodying my invention and shown partly in cross-section.
Figure 3:
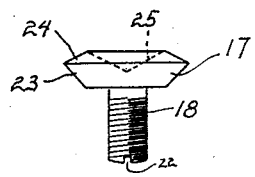
Fig. 3 is a view of one of the parts of my improved caster shown assembled with the caster in Fig. 1.

At 1, I have shown the stem of the caster, adapted to be inserted in the usual or any desired form of socket in the leg or other portion of the piece of furniture or the like to be supported. It will, therefore, be apparent that I have chosen to illustrate and describe my invention as applied to a swiveling caster of the stem type. But, as the disclosure of my invention proceeds, it will also be apparent that my invention may be applied to types of casters having a generally horizontal planular top plate which may be attached to the furniture by screws.

The stem 1 has adjacent its lower end a flange 2 which provides an exterior shoulder 3 and an internal shoulder 4. The stem terminates downwardly in a reduced neck 5 adapted to be inserted through an aperture 6 in a bearing housing 7, preferably of sheet metal an then riveted over as at 8 to rigidly secure the stem 1 to the housing 7.

The housing 7, preferably formed from sheet metal comprises a horizontal head 9 from which extends an outwardly depending skirt 10 generally of cone form. The skirt 10 adjacent its lower end is spun or otherwise bent or curved inwardly as at 11. The parts thus far described comprise that portion of the caster 11 associated with the piece of furniture.

The parts of the caster associated with the floor will now be described. They comprise the usual or any suitable form of roller 13 having a rotational bearing 140 in a yoke 15. The yoke is preferably formed from sheet metal and at its upper extremity is pressed or otherwise given an exterior upper surface of horizontally truncated cone form 14, the horizontal sheet metal web 16, thus provided, being axially perforated as at 19. A generally circular core member 17 provided with a downwardly directed threaded stem 18 is mounted on the web 16 by passing the stem 18 downwardly through the perforation 19 and tightly drawing up a nut 20 on the stem. A lock washer 21 may be interposed between the nut 20 and the web 16. The stem 18 may be provided with a slot 22 to hold the stem from turning while the nut is being screwed up or to turn the stem 18 in the nut 20 to facilitate tightening these parts. The core member 17 while generally of circular disk form has the form of a truncated cone, having the conical surface 23 and the planular cut-off portion of the cone being at right angles to its axis and resting upon the web 16, as above described. The upper face of the core 17 may similarly be of truncated cone form as indicated at 24, and the upper face may be provided with a central recess 25 to give clearance to the riveted over portion 8 of the stem 1, thus permitting the associated parts to be compactly nested together.

Between the core 17 and the skirt 10 are the bearing balls 26. In assembling the bearing, the core 17 may be first placed within the skirt 10 and then the balls inserted and then the head 14 of the yoke threaded over the stem 18 and the nut put in place.

By this construction, four surfaces are provided which are generally conical: the surface 23 of the core 17, an inner surface 27 on the turned in portion 11, the outer surface 28 of the cone 14 and the inner surface 29 of the skirt 10. The surfaces 23 and 27 are disposed with their cone apices downwardly and the surfaces 28 and 29 with their apices upwardly. The balls 26 thus run in an annular chamber on these four surfaces on circular lines thereon. To insure that the contact with the surfaces 29 and 27 will be on circular lines thereof when the portion 11 is bent in, as above described, the radius of curvature at 127 is made smaller than the radius of the ball.

Preferably the taper of the four said generally conical surfaces and the arrangement and disposition of the parts is such that a diameter of the ball such as indicated at $x$ will intersect the conical surface 23 and intersect the conical surface 27 in the circles of contact therewith made by the balls and so that a diameter such as $y$ at right angles to the diameter $x$ will correspondingly intersect surfaces 29 and 28 in the circles of contact therewith made by the balls. These exact mathematical relations are not essential to the successful functioning of my improved swivel caster, but it is desirable for practical purposes that these relations obtain to a sufficient degree of accuracy so that the circles on the core 23 and 28 will lie inside of a cylinder co-axial or concentric with these circles and passing through the centers of the balls and that the circles on the surfaces 29 and 27 will lie outside of said cylinder.

It will thus appear, furthermore, that the four surfaces described need not conform to true cone surfaces, it being essential only that these surfaces provide material at the circles thereon for the balls to roll on. But, the conical shape and surface given to these parts, as shown in the drawings, is given to them to facilitate their manufacture and to result in a compact, small, cheap, easily assembled construction.

This case is divisional from my application Serial No. 115,279, filed June 11, 1926, for casters.

Having thus described my invention I am aware that numerous and extensive departures may be made from the embodiment herein illustrated and described but without departing from the spirit of my invention.

I claim:

1. In a swiveling caster, a sheet metal load supporting element, a sheet metal forked wheel carrying yoke, an upwardly tapering outwardly convex frusto-conical head on the yoke, a downwardly tapering frusto-conical disk on the head, attaching means for the disk between the yoke forks the head and disk including therebetween an inner horizontal annular outwardly concave V-shaped groove, a depending skirt on the load supporting element having an upwardly tapering internally concave wall, the lower end of the skirt being inwardly turned to include between the wall and the end an outer annular horizontal inwardly concave V-shaped groove, the two grooves being disposed opposite to each other and their side walls being adapted to serve as ball races and a plurality of balls in the said grooves.

2. In a swiveling caster, a sheet metal load supporting element, a forked wheel carrying yoke, formed of sheet metal and having in its upper end a horizontally frustated upwardly tapering conical head, a perforation in the horizontal surface thereof, a disk on the head, a stem on the disk passing downwardly through the perforation, a nut on the stem between the yoke forks, the head and disk including therebetween an inner horizontal annular outwardly V-shaped concave groove, a downwardly depending skirt of sheet metal secured to the load supporting element, said skirt having an inner upwardly tapering inwardly concave annular conical wall and the lower end of the skirt being bent inwardly to form a downwardly tapering inwardly concave annular conical wall, thus forming an outer annular horizontal inwardly concave V-shaped groove adjacent the lower end of the skirt and opposite the said inner groove, and a plurality of balls in the grooves.

3. In a swiveling caster, a sheet metal load supporting element, a forked wheel carrying yoke, formed of sheet metal and having in its upper end a horizontally frustated upwardly tapering conical head, a perforation in the horizontal surface thereof, a disk on the head, a stem on the disk passing downwardly through the perforation, a nut on the stem between the yoke forks, the head and disk including therebetween an inner horizontal annular outwardly V-shaped concave groove, a downwardly depending skirt of sheet metal secured to the load supporting element, said skirt having an inner upwardly tapering inwardly concave annular conical wall and the lower end of the skirt being bent inwardly to form a downwardly tapering inwardly concave annular conical wall, thus forming an outer annular horizontal inwardly concave V-shaped groove adjacent the lower end of the skirt and opposite the said inner groove, and a plurality of balls in the grooves, said skirt having an annular lower edge extended substantially to the said conical head of the yoke.

4. In a swiveling caster, a sheet metal load supporting element, a sheet metal skirt secured thereto and depending therefrom, the skirt being provided with an outer inwardly concave annular horizontal V-shaped groove and terminating downwardly in an annular edge, a sheet metal forked yoke, a wheel rotatably mounted in the yoke, a head at the upper end of the yoke of frusto conical upwardly tapering form, a frusto conical downwardly tapering washer, the frustated portions of the head and washer being in juxtaposition, a perforation in the head, a threaded stem on the washer passing therethrough, a nut on the stem between the yoke forks, the head and washer providing an inner outwardly concave horizontal annular V-shaped groove, balls in the groove, the skirt depending substantially to the said conical surface of the yoke.

5. In a swiveling caster, a sheet metal load supporting element, a forked wheel carrying yoke, an upwardly tapering outwardly convex frusto conical head on the yoke, a downwardly tapering frusto conical disk on the head, attachment means for the disk between the yoke forks the head and disk including therebetween an inner horizontal annular outwardly concave V-shaped groove, a depending skirt on the load supporting element having an upwardly tapering internally concave wall, the lower end of the skirt being inwardly turned to include between the wall and the end an outer annular horizontal inwardly concave V-shaped groove, the two grooves being disposed opposite to each other and their side walls being adapted to serve as ball races and a plurality of balls in the said grooves, the balls contacting with the races on horizontal circular lines of contact with the inner groove and with the outer groove lying respectively inside and outside of the surface of a cylinder passing through the centers of the balls and co-axial with the said circles.

In testimony whereof I hereunto affix my signature this 24th day of June, 1929.

WILFRED G. JOHNSON.